Aug. 15, 1933.　　　E. G. BAER　　　1,922,023
COAL FEED SCREW
Filed July 20, 1932
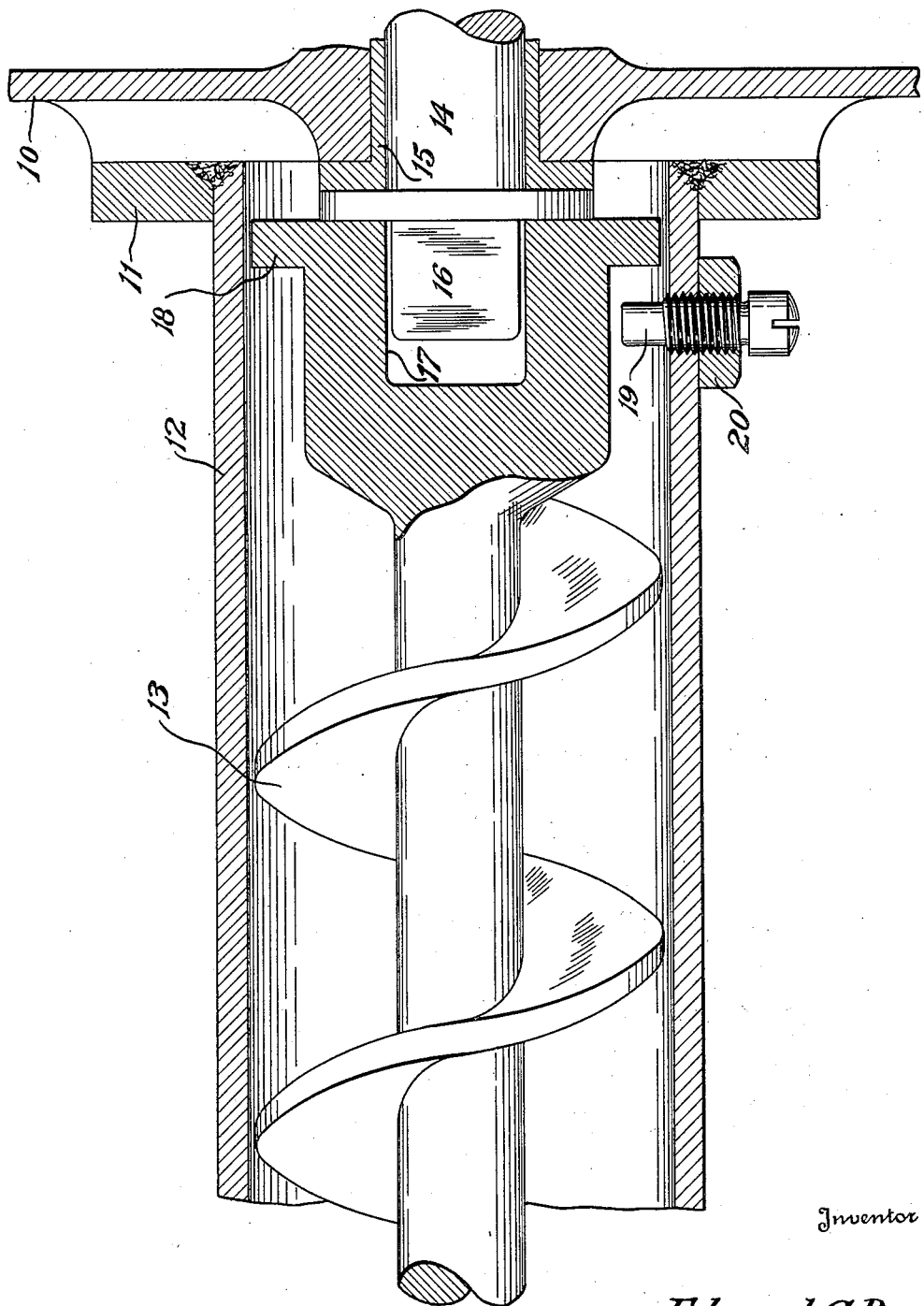
Inventor
Edward G. Baer
By Frease and Bishop
Attorneys Patented Aug. 15, 1933

1,922,023

UNITED STATES PATENT OFFICE 1,922,023

COAL FEED SCREW

Edward G. Baer, Orrville, Ohio, assignor to The Will - Burt Company, Orrville, Ohio, a Corporation of Ohio Application July 20, 1932. Serial No. 623,585

4 Claims. (Cl. 198—213)

The invention relates to feed screws for feeding coal to stokers and the like and more particularly to the connection between the feed screw and the main drive shaft of the stoker.

The usual practice in connecting the coal feed screw of a stoker to the drive shaft is to provide a squared socket in one member and a squared end upon the other member arranged to normally fit into the socket so as to drive the coal feed screw with the drive shaft. The ordinary shape of the socket and end of the other member is square as this is the easiest shape to produce although any corresponding shape of socket and end with at least one flattened or recessed side may be used to accomplish the purpose.

Due to the location of this connection, between the drive shaft and coal feed screw, within the coal feed tube, it is not practical or convenient to fasten the two parts rigidly together to prevent them from becoming disengaged, and in the normal operation of the stoker, when feeding coal, there is no tendency of the parts to separate, because the pressure of the screw against the coal prevents the feed screw from moving out of engagement with the drive shaft.

Occasionally pieces of metal, rock, wood, stones or other hard foreign matter find their way into the coal and are carried along the coal feed screw to the end of the coal tube opening in the hopper or partially through the coal feed tube.

If the obstruction is too large to go through the tube, between the flights of the screw, it stops the rotation of the feed screw which results in breaking the shear pin or throwing out the overload release, depending upon which device is used to protect the motor and feed mechanism.

This results in the obstruction being tightly wedged between the flight of the feed screw and the end of the coal tube opening or partially through the coal feed tube, and before it can be released, it is necessary to turn the screw backward. If the screw is turned slightly more than a certain distance, the screw becomes disengaged from the drive shaft due to the screw advancing into the coal in the manner of an auger bit when boring into wood or the like.

This necessitates the removal of all of the coal from the hopper and frequently requires the entire machine being torn down before the coal feed screw and drive shaft can be re-engaged with each other. Sometimes the foreign matter will not stop at the end of the coal tube opening but will enter the tube and become lodged at some point within the tube which requires a considerable number of turns of the screw in the reverse direction, in which case the socket joint will be separated, causing considerable trouble.

The object of the present improvement is to provide means for preventing the socket joint from becoming disengaged when turning the screw in the reverse direction, as above described, thus preventing the considerable difficulty and inconvenience caused by this disengagement of the feed screw from the drive shaft.

The above and other objects may be attained by providing an annular flange upon the end of the feed screw adjacent to the point of connection with the drive shaft and by providing a set screw or other stop upon the interior of the coal tube at a point normally spaced from said flange and so located that when the flange contacts with said stop, it will prevent further longitudinal movement of the feed screw in that direction, thus maintaining the connection between the feed screw and drive shaft regardless of the amount of reverse rotation of the screw.

The drawing shows a longitudinal sectional elevation of the adjoining end portions of the coal feed screw and drive shaft showing the improved means for preventing the feed screw from becoming entirely disengaged from the drive shaft.

Similar numerals refer to similar parts throughout the drawing.

A portion of the gear case is shown at 10, this showing the back of the gear case to which is cast a flange to match the flange 11 which is attached, as by welding or the like, to the coal feed tube 12, within which is rotatably mounted the coal feed screw 13.

The drive shaft 14 extends through the back of the gear case, being arranged to be driven by any usual and well known arrangement of gearing adapted to be located in said case, one end portion of the shaft projecting through the back of the gear case and being extended into the adjacent end of the coal tube 12, being journaled within a bushing 15 located in the adjacent back wall of the gear case.

This projecting end of the drive shaft is adapted to be detachably connected to the adjacent end of the coal feed screw in usual and ordinary manner by a longitudinal, slidable connection, as by providing a flattened or squared socket in one of said members and a flattened or squared end upon the other member for engagement in said socket whereby the coal feed screw will be driven by the drive shaft.

For the purpose of illustration, the projecting end of the drive shaft is squared as at 16 and the adjacent end of the coal feed screw is provided with a square socket 17 which normally receives the squared end 16 of the drive shaft whereby the feed screw will be rotated by the drive shaft.

In the event a piece of metal, hard rock or wood, a stone or other foreign matter is carried along the screw and gets wedged in the tube between the flights of the screw, the rotation of the screw will be stopped by the obstruction, resulting in breaking of the ordinary shear pin or throwing out of the overload release, whichever may be used in the mechanism. Before the obstruction can be released it is then necessary to turn the coal feed screw backwards, advancing the same into the coal and pulling the socket end of the feed screw away from the drive shaft.

It will be seen that if the screw is turned beyond a certain point, the squared end and socket connection will be disengaged and in order to prevent the same, an annular flange 18 is formed upon the socket end of the feed screw and a stop, which may be in the form of a set screw 19, is located through the feed tube at a point spaced from said flange sufficiently to permit some advancing movement of the screw without permitting the socket thereof to become entirely disengaged from the squared end 16 of the drive shaft. A jamb nut 20 may be provided for holding the set screw in adjusted position.

With this construction it will be seen that the coal feed screw may be rotated backward sufficiently to release the obstruction while it is positively prevented from becoming disengaged from the drive shaft, thus obviating the difficulties encountered in this operation of the usual form of such mechanism and making it unnecessary to remove all of the coal from the hopper or to tear down the machine in order to get the parts back in proper position.

I claim:
1. Stoker mechanism including a drive shaft, a coal feed screw, a longitudinally slidable connection between the shaft and screw, a tube in which the screw is located, an annular flange upon the screw and a stop fixed to the tube and normally out of contact with the flange but adapted for engagement with said flange to prevent disengagement of said connection when the screw is rotated in reverse direction.

2. Stoker mechanism including a drive shaft, a coal feed screw, a longitudinally slidable connection between the shaft and screw, a tube in which the screw is located, an annular flange upon the screw and a set screw fixed to the tube and normally out of contact with the flange but adapted for engagement with said flange to prevent disengagement of said connection when the screw is rotated in reverse direction.

3. Stoker mechanism including a drive shaft, a coal feed screw, a flattened end upon one of said members, a flattened socket in the other member to receive said flattened end, a tube in which the screw is located, an annular flange upon the screw, and a stop fixed to the tube and normally out of contact with the flange but adapted for engagement with said flange to prevent disengagement of said screw and shaft when the screw is rotated in reverse direction.

4. Stoker mechanism including a drive shaft, a coal feed screw, a square end upon one of said members, a square socket in the other member to receive said equare end, a tube in which the screw is located, an annular flange upon the screw, and a stop fixed to the tube and normally out of contact with the flange but adapted for engagement with said flange to prevent disengagement af said screw and shaft when the screw is rotated in reverse direction.

EDWARD G. BAER.